(12) United States Patent
Zhang et al.

(10) Patent No.: US 12,066,211 B2
(45) Date of Patent: Aug. 20, 2024

(54) DEHUMIDIFIER

(71) Applicants: GD MIDEA AIR-CONDITIONING EQUIPMENT CO., LTD., Foshan (CN); MIDEA GROUP CO., LTD., Foshan (CN)

(72) Inventors: Zhiming Zhang, Foshan (CN); Xiaoyu Wang, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 343 days.

(21) Appl. No.: 17/622,006

(22) PCT Filed: Jan. 19, 2020

(86) PCT No.: PCT/CN2020/072907
§ 371 (c)(1),
(2) Date: Dec. 22, 2021

(87) PCT Pub. No.: WO2020/258876
PCT Pub. Date: Dec. 30, 2020

(65) Prior Publication Data
US 2022/0268483 A1    Aug. 25, 2022

(30) Foreign Application Priority Data

Jun. 25, 2019 (CN) .......................... 201910558092.8
Jun. 25, 2019 (CN) .......................... 201920970418.3

(51) Int. Cl.
*F24F 13/22* (2006.01)
*B01D 53/26* (2006.01)
(Continued)

(52) U.S. Cl.
CPC .......... *F24F 13/222* (2013.01); *B01D 53/265* (2013.01); *F24F 13/20* (2013.01); *F24F 1/0358* (2019.02)

(58) Field of Classification Search
CPC .......... F24F 13/222; F24F 13/20; F25B 21/14
See application file for complete search history.

(56) References Cited

U.S. PATENT DOCUMENTS

2001/0037630 A1* 11/2001 Eom ....................... F24F 13/20
                                                              55/467
2006/0278085 A1* 12/2006 Kim ..................... B01D 53/265
                                                              96/140

(Continued)

FOREIGN PATENT DOCUMENTS

CN    202813678 U    3/2013
CN    202993413 U    6/2013
(Continued)

OTHER PUBLICATIONS

KR-20080003528-A translation (Year: 2008).*
(Continued)

*Primary Examiner* — David J Teitelbaum
(74) *Attorney, Agent, or Firm* — Anova Law Group, PLLC (57) ABSTRACT

A dehumidifier includes a housing, a motor bracket provided in the housing; and a water pan. The housing includes a top cover provided with a mounting hole and a handle movably provided in the mounting hole in a vertical direction. A gap is formed between the handle and a circumferential wall surface of the mounting hole. The motor bracket includes a top wall below the gap, and the top wall is provided with an overflow hole. The water pan is provided below the overflow hole and configured to receive water flowing out via the overflow hole.

20 Claims, 6 Drawing Sheets

(51) Int. Cl.
*F24F 13/20* (2006.01)
*F24F 1/0358* (2019.01)

(56) References Cited

U.S. PATENT DOCUMENTS

| | | | | |
|---|---|---|---|---|
| 2016/0010882 | A1* | 1/2016 | Lee | A47B 81/00 |
| | | | | 312/236 |
| 2019/0137121 | A1* | 5/2019 | Swanson | F24F 1/028 |

FOREIGN PATENT DOCUMENTS

| | | |
|---|---|---|
| CN | 105276712 A | 1/2016 |
| CN | 105605693 A | 5/2016 |
| CN | 106482235 A | 3/2017 |
| CN | 206919218 U | 1/2018 |
| CN | 107676948 A | 2/2018 |
| CN | 108302630 A | 7/2018 |
| CN | 110145817 A | 8/2019 |
| CN | 210241810 U | 4/2020 |
| JP | H06129665 A | 5/1994 |
| KR | 200146109 Y1 * | 6/1999 |
| KR | 20080003528 A * | 1/2008 |
| KR | 20140110654 A | 9/2014 |
| WO | 2016067817 A1 | 5/2016 |

OTHER PUBLICATIONS

KR-200146109-Y1 translation (Year: 1999).*
World Intellectual Property Organization (WIPO) International Search Report and Written Opinion for PCT/CN2020/072907 Apr. 17, 2020 17 Pages (with translation).
The China National Intellectual Property Administration (CNIPA) The First Office Action for Chinese Application 201910558092.8 Dec. 1, 2023 12 Pages (With Translation).

* cited by examiner

DEHUMIDIFIER

CROSS-REFERENCE TO RELATED APPLICATIONS

The present application is a National Stage Entry under 35 U.S.C. § 371 of International Application No. PCT/CN2020/072907, filed on Jan. 19, 2020, which claims priority to Chinese patent application Nos. 201910558092.8 and 201920970418.3, both filed on Jun. 25, 2019 and titled "dehumidifier." The entire disclosures of the above-mentioned applications are incorporated herein by reference.

TECHNICAL FIELD

The present application relates to the field of adjustment of air humidity, and in particular, to a dehumidifier.

BACKGROUND

In general, dehumidifier is a device that lowers indoor humidity by introducing indoor moist air into the interior of the body, lowering the humidity through a heat exchanger composed of an evaporator and a condenser in which refrigerant flows, and then discharging the dehumidified air into the room.

The upper cover of a dehumidifier is usually provided with a movable handle, and there is a sliding gap between the handle and the top cover, and the user may accidentally pour water into the gap, and the water will flow into the machine along the gap. Since there are power-on components inside the machine, if the water touches a power-on component, it will cause the user to get an electric shock and other safety hazards such as fire. The related art is to prevent water from flowing from the openings to the power-on components by adding parts and sponge seals, and changing the layouts of the power-on components, etc., thus, the structure of the entire dehumidifier becomes complicated.

The above content is only used to assist in the understanding of the technical solutions of the present application, and does not mean to concede that the above content is prior art.

SUMMARY

The main purpose of the present application is to propose a dehumidifier to solve one or more technical issues presented above.

In order to achieve the above object, the dehumidifier proposed in the present application includes a housing, a motor bracket and a water pan;
  the housing includes a top cover, the top cover is provided with a gap;
  the motor bracket is provided in the housing, the motor bracket has a top wall below the gap, and the top wall is provided with a first overflow hole;
  the water pan is provided below the first overflow hole and configured to receive water flowing out via the first overflow hole.

In one embodiment, the top wall is provided with a water groove below the gap, the first overflow hole on the top wall is provided in the water groove.

In one embodiment, the first overflow hole extends in a width direction of the top wall and penetrates through the top wall.

In one embodiment, the dehumidifier further includes a heat exchanger, the motor bracket further has a first sidewall connected to the top wall, and the top wall, the first sidewall, the heat exchanger and the housing enclose to form the water groove.

In one embodiment, the motor bracket is further provided with a water blocking plate, the water blocking plate, the top wall, the first sidewall, the heat exchanger and the housing enclose to form the water groove.

In one embodiment, an annular plate is provided at the top wall, the annular plate and the top wall form the water groove.

In one embodiment, the motor bracket further has a second sidewall connected to the top wall, the second sidewall being located at one end of the top wall away from the first sidewall, the second sidewall is provided with a water blocking plate, and the water blocking plate and the second sidewall enclose to form an overflow groove.

In one embodiment, the second sidewall is provided with a second overflow hole corresponding to the overflow groove, and a bottom of the second sidewall faces the water pan.

In one embodiment, the second overflow hole is provided below the overflow groove.

In one embodiment, the water blocking plate includes a side plate and a bottom plate connected to the side plate and the second sidewall, the bottom plate is titled downward from the side plate to the second sidewall.

In one embodiment, the side plate and the bottom plate are integrally formed.

In one embodiment, the first overflow hole is provided at an intersection of the top wall and the second sidewall.

In one embodiment, the dehumidifier further includes a water guiding member, and one end of the water guiding member is in communication with the first overflow hole, and the other end of the water guiding member is close to the second sidewall and forms a gap with the second sidewall to introduce water flowing through the first overflow hole into the second sidewall.

In one embodiment, the top wall is titled downward from its position corresponding to the gap to the first overflow hole.

In one embodiment, the handle is provided in a central portion of the top cover.

In one embodiment, the handle includes a gripping member and a pulling member connected to the gripping member, one of the pulling member and the housing is provided with a sliding member, and the other one of the pulling member and the housing is provided with a sliding groove extending in the vertical direction, the sliding member is slidably provided in the sliding groove.

In one embodiment, the pulling member is a pulling rod, the number of the pulling rod is one and the pulling rod is provided at a central position of the gripping member.

In one embodiment, the sliding groove has a first limit sliding position and a second limit sliding position, and the gripping member protrudes from the top cover when the sliding member slides to the first limit sliding position, and when the sliding member slides to the second limit sliding position, the top surface of the gripping member is flush with the top surface of the top cover, or the top surface of the gripping member is lower than the top surface of the top cover.

In one embodiment, the outer wall surface of the sliding member forms a gap with the inner wall surface of the sliding groove, so that the sliding member is slidable from the first limit sliding position to the second limit sliding position.

In one embodiment, the pulling member includes a pulling pod provided at both ends of the gripping member, and the sliding groove is provided at each of the pulling pods, a sliding member is provided at a position of the housing corresponding to the sliding groove.

In the dehumidifier of the present application, a first overflow hole is provided at the top wall of the motor bracket below the gap of the top cover, such that the water pan is correspondingly provided below the first overflow hole, thus the liquid flowing from the gap between the handle and the mounting hole will fall on the top wall of the motor bracket, and then in the water pan through the first overflow hole, such that the liquid flowing from the gap between the handle and the mounting hole will not affect the power-on components inside the machine, thereby avoiding safety hazards such as user electric shock and fire.

BRIEF DESCRIPTION OF THE DRAWINGS

In order to more clearly explain the technical solutions of examples of the present application or existing technologies, the following will briefly introduce the drawings required to be used in the embodiments or the existing technologies. It is obvious that the drawings in the following description are only some embodiments of the present application. For those skilled in the art, other drawings can also be obtained according to the structure shown in these drawings, without any creative work.

REFERENCE NUMERAL DESCRIPTION

| Reference Numeral | Name |
| --- | --- |
| 1 | housing |
| 11 | top cover |
| 111 | gap |
| 112 | mounting holes |
| 12 | handle |
| 121 | gripping member |
| 122 | pulling member |
| 123 | sliding member |
| 13 | sliding groove |
| 2 | motor bracket |
| 21 | top wall |
| 211 | first overflow hole |
| 22 | water groove |
| 23 | first sidewall |
| 24 | water blocking plate |
| 241 | side plate |
| 242 | bottom plate |
| 25 | second sidewall |
| 251 | second overflow hole |
| 26 | overflow groove |
| 3 | water pan |
| 4 | heat exchanger |

The implementation of a purpose, functional characteristics and advantages of the present application will be further described with reference to the accompanying drawings.

DETAILED DESCRIPTION OF THE EMBODIMENTS

It should be noted that if there is a directional indication (such as above, lower, left, right, front, back, . . . ), the directional indication is only used to explain relative positional relationships, the movement conditions and so on among the components under a specific attitude (as shown in figures), if the specific attitude changes, the directional indication also correspondingly changes.

Further, if description associated with "first," "second" and so on is included in an embodiment of the present application, "first," "second" and so on are used only for the purpose of description, and should not be understood as indicating or implying its relative importance or implicitly indicating the number of technical features indicated. Thus, a feature associated with "first," "second" can indicate or implicitly include at least one of the feature. In addition, the meaning of "and/or" in the full text includes three parallel solutions, for examples, "A and/or B" includes A solution, or B solution, or both A and B solutions.

The present application proposes a dehumidifier.

In the embodiments of the present application, as shown in FIGS. 1 to 6, the dehumidifier includes a housing 1, a motor bracket 2, and a water pan 3. The housing 1 includes a top cover 11 and a handle 12, the top cover 11 is provide with a mounting hole 112, and the handle 12 is movably provided in the mounting hole 112 in a vertical direction, and a gap 111 is formed between the handle 12 and a circumferential wall surface of the mounting hole 112. The motor bracket 2 is provided in the housing 1, and the motor bracket 2 has a top wall 21 below the gap 111, the top wall 21 is provided with a first overflow hole 211. The water pan 3 is provided below the first overflow hole 211, and the water pan 3 is configured to receive water flowing out via the first overflow hole 211.

In practical applications, an air suction port is formed in the front of the housing 1 of the dehumidifier, and an air discharge port is formed in the back of the housing 1. A fan is provided in the housing 1, the fan introduces moist air via the air suction port, and discharges dry air via the air discharge port. The housing 1 is also provided with a heat exchanger 4 composed of a condenser (that is an evaporator), and a compressor for compressing refrigerant. The drainage structure of the dehumidifier is mainly composed of the water pan 3 and a water groove, and the water pan 3 is provided below the heat exchanger 4, the condensed water falling from the heat exchanger 4 during dehumidification is gathered by the water pan 3. The water groove is provided at a lower side of the housing 1 for storing the condensed water falling from a falling opening of the water pan 3. The housing 1 is typically composed of a top cover 11, a partition plate, and a bottom plate, and the water pan 3 is supported by the partition plate formed vertically above the bottom plate. The heat exchanger 4 is provided above the partition plate. The partition plate is formed by projecting vertically from the bottom plate, thereby separating the space for the water groove from the space for receiving the compressor.

Figure 5:
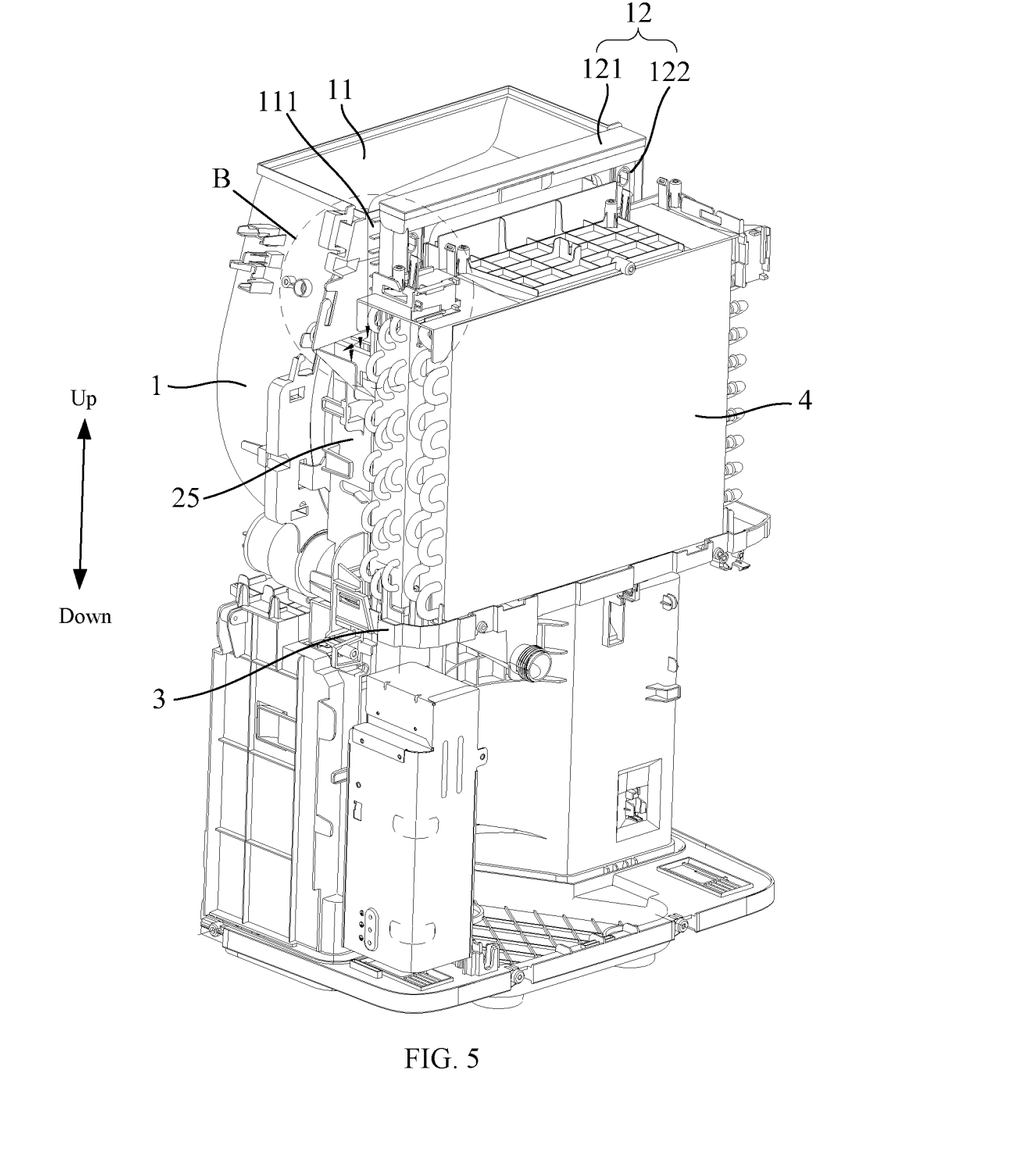
FIG. 5 is a schematic structural diagram of another embodiment of the dehumidifier of the present application.

Specifically, as shown in FIG. 5, the dehumidifier further includes an electric control box, and the electric control box is provided between the housing 1 and the motor bracket 2. Due to providing the electric control box between the housing 1 and the motor bracket 2, the electric control box is avoided from being provided adjacent to the first overflow hole 211 and the water pan 3, thereby preventing water in the first overflow hole 211 and the water pan 3 from splashing or flowing into the electric control box, and avoiding short circuit, electric shock, fire, etc.

In the present embodiment, the housing 1 forms an appearance of the dehumidifier, and provides electrical isolation and protection for components accommodated within the housing 1. The cross-sectional shape of the housing 1 may be circular, elliptical, rectangular, etc., which is not specifically limited herein. The size and shape of the housing 1 can be changed according to the actual use requirements.

A handle 12 is provided at the housing 1, such that the handle 12 can be movably provided in the mounting hole 112 in the vertical direction. It is convenient to extract and remove the dehumidifier, and the height of the handle 12 can be adjusted at any time, so that the dehumidifier is more convenient to use, and the user experience is better. Through the mounting hole 112, the left and right, and forward and backward movements of the handle 12 can be avoided, thereby ensuring the verticality of the handle 12 when being pulled, so that the pulling of the handle 12 is smoother. Since the handle 12 requires a movable space, there is a gap 11 between the handle 12 and the circumferential wall surface of the mounting hole 112, and the water flows into the machine along the gap 111, thereby affecting the power-on components, causing safety hazards such as electric shock to the user, fire, etc. Alternatively, the handle 12 is provided in the middle of the top cover 11. As such, the center and center of gravity of the dehumidifier fall on the handle 12 when the dehumidifier is lifted, such that the dehumidifier is maintained in a state of stable when the dehumidifier is lifted. The handle 12 can achieve the movement along the vertical direction by the engagement structure 13 of a sliding rail and a sliding groove, a screw and a threaded rod, etc.

It should be noted that when the liquid flows from another opening on the top cover 11 such as a mounting gap formed by a screw connecting the opening into the housing 1, the liquid also can fall on the water pan 3 through the top cover 21 and the first overflow hole 211, thereby preventing the liquid from affecting the power-on components. The fan or wind wheel is driven by a motor, which is provided within the housing 1 by the motor bracket 2, and the motor bracket 2 provides support and connection for the motor. The motor bracket 2 is typically provided at the upper side of the housing 1. The motor bracket 2 and the housing 1 can be connected by methods such as screwing, snapping, bonding, and so on. The motor bracket 2 can be combined by several plates. It will be appreciated that the top wall 21 of the motor bracket 2 refers to a partial position below the gap 111 of the top cover 11. The top wall 21 can be horizontal or tilted. Alternatively, the top wall 21 extends in the direction from a position of the top wall 21 corresponding to the gap 111 to the first overflow hole 211 and titled downwards. Thus, the tilting of the top wall 21 itself can guide the fluid, so that the water flowing from the gap 111 flows into the first overflow hole 211 quickly and smoothly.

There is a certain space or gap 111 between the top wall 21 of the motor bracket 2 and the top cover 11, such that it enables the liquid flowing from the gap 111 of the top cover 11 to fall on the top wall 21 of the motor bracket 2, and then pass through the first overflow hole 211 to flow into the water pan 3, it is possible to prevent water flowing from the gap 111 of the top cover 11 from contacting the power-on components. It should be noted that if there is no enclosing plate provided around the top wall 21, providing the first overflow hole 211 at the top wall 21 can still guide portion of the water into the water pan 3, thereby reducing the water flowing to the power-on components. The first overflow hole 211 can be one or more, the shape of the first overflow hole 211 may be circular, rectangular, elliptical, and so on, and the specific shape thereof can be selected and designed according to the requirements, which is not limited thereto. The water pan 3 can be provided below the motor bracket 2, that is, the water pan 3 can be the water pan 3 used to collect the condensate water falling from the heat exchanger 4, or be an another separate water pan 3, which is provided at a position corresponding to and close to the first overflow hole 211 to receive the water flowing from the first overflow hole 211. The water pan 3 is substantially a disc-shaped body, or it can be a water collecting groove surrounded by enclosing plates. The specific shape and size of the water pan 3 can be designed according to the requirements, and are not specifically limited herein.

In the dehumidifier of the present application, a first overflow hole 211 is provided at the top wall 21 of the motor bracket 2 below the gap 111 of the top cover 11, and the water pan 3 is correspondingly provided below the first overflow hole 211, thus the liquid flowing from the gap 11 between the handle 12 and the mounting hole 112 falls on the top wall 21 of the motor bracket 2, and then falls in the water pan 3 through the first overflow hole 211, such that the liquid flowing from the gap 111 between the handle 12 and the mounting hole 112 does not affect the power-on components inside the machine, thereby avoiding safety hazards such as electric shock to the user and fire.

Figure 6:
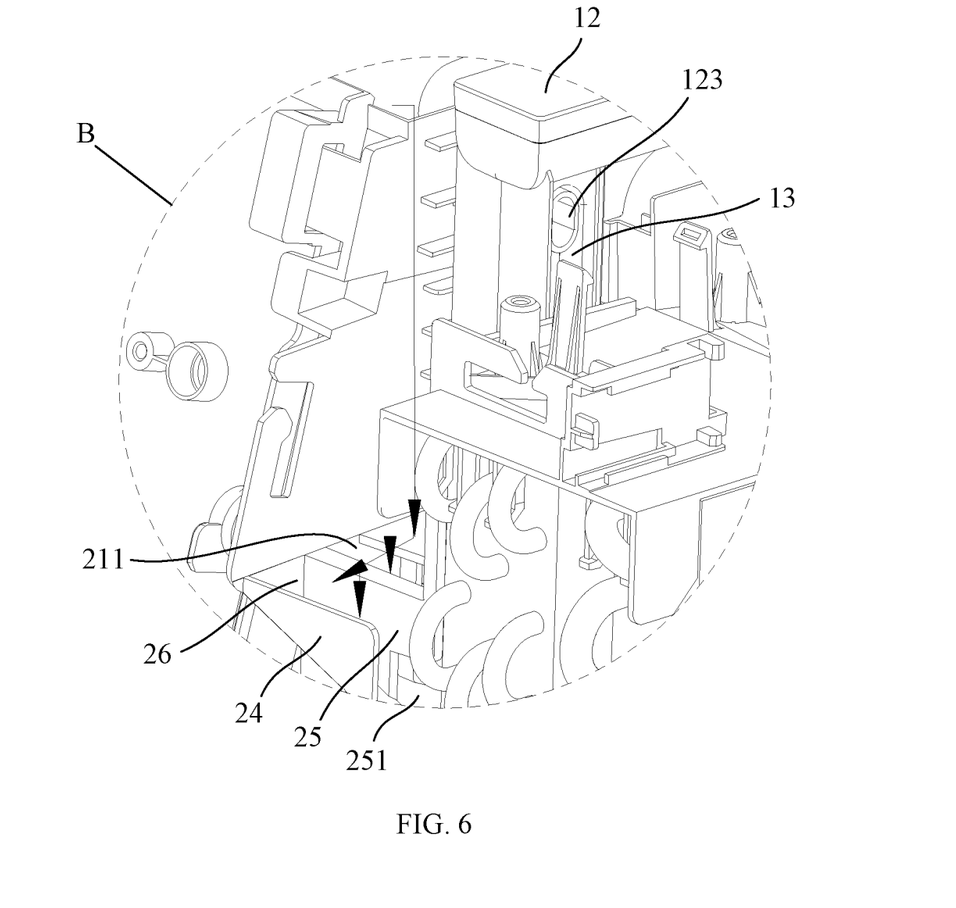
FIG. 6 is an enlarged view of portion B in FIG. 5.
Figure 7:
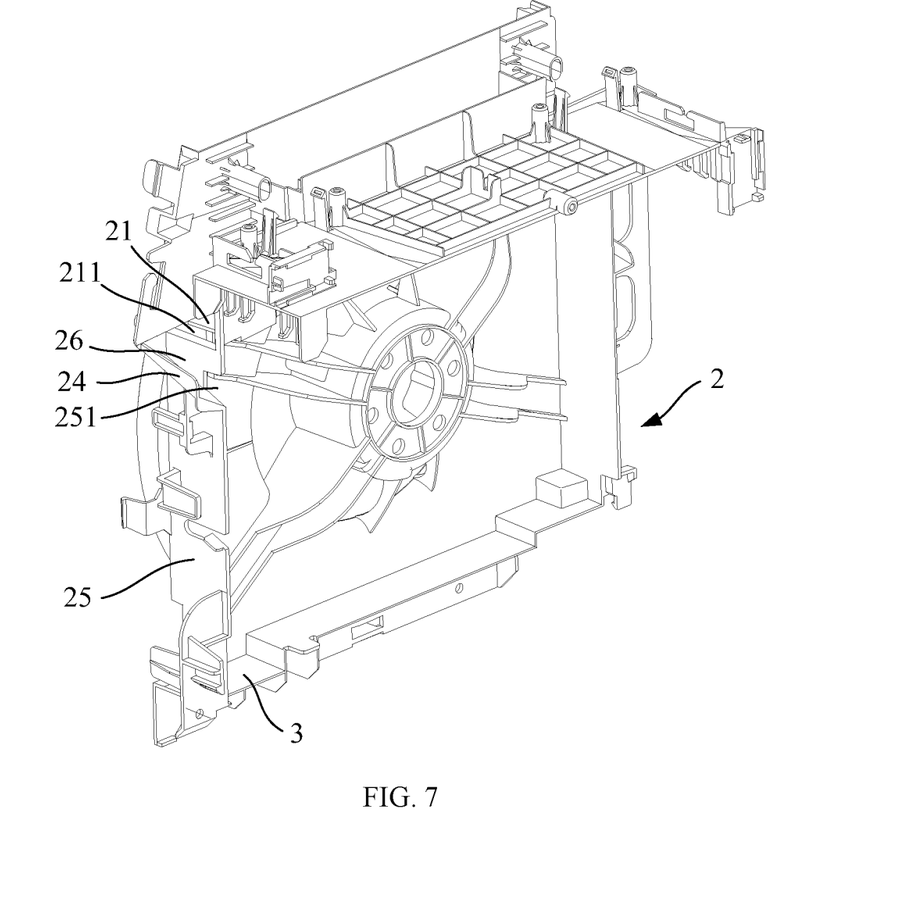
FIG. 7 is a schematic partial structural diagram of the dehumidifier of the present application.

In a preferred embodiment, referring to FIGS. 5-7, the first overflow hole 211 extends in the width direction of the top wall 21 and penetrates through the top wall 21. As such, the first overflow hole 211 is sufficiently large to satisfy a large amount of water flowing, and at the same time, it can prevent the water from flowing across the first overflow hole 211 and out from the edge of the top wall 21 to a certain extent in case of a large amount of water.

In one embodiment, the top wall 21 is formed with a water groove 22 located below the gap 111, and the first overflow hole 211 is defined in the water groove 22.

In the present embodiment, it can be understood that the water groove 22 formed on the top wall 21 refers to a water groove having the top wall 21 as the bottom surface, and other components as sidewall surfaces. For example, in an embodiment, an annular plate is provided at the top wall 21, and the annular plate and the top wall 21 form the water groove 22. The first overflow hole 211 is provided in the water groove, the water flowing from the gap 111 can be fully gathered in the water groove, and then all flows from the first overflow hole 211 into the water pan 3, and does not flow to the outer side of the top wall 211, thus, it is possible to effectively and comprehensively avoid the water flowing from the gap 111 flowing to the power-on components in the machine.

On the basis of the above embodiment, as shown in FIGS. 3 to 7, the dehumidifier further includes a heat exchanger 4, and the motor bracket 2 also has a first sidewall 23 connecting to the top wall 21, the top wall 21, the first sidewall 23, the heat exchanger 4 and the housing enclose to form the water groove 22.

In the present embodiment, the first sidewall 23 is connected to the top wall 21, and the angle therebetween may be a right angle, an acute angle or an obtuse angle. It should be noted that the motor bracket 2 can have two first sidewalls 23, such that the first sidewall 23, the top wall 21, the first sidewall 23, the heat exchanger 4 and the housing 1 enclose to form a complete water groove 22 without a notch. It is also possible to make the first sidewall 23, the top wall 21, the first sidewall 23, the heat exchanger 4, and the housing 1 to enclose to form a complete and no notch water groove 22 by changing the structure or position of the housing 1 or exchanger 4, so that the sidewall surface of the water groove 22 is naturally formed by the internal structure of the dehumidifier, no additional process and structure, such as additional annular plate, are required, thereby making the entire structure simpler, saving space and making the internal structure of the dehumidifier more compact.

Further, the motor bracket 2 is also provided with a water blocking plate 24, the water blocking plate 24, the top wall 21, the first sidewall 23, the heat exchanger 4, and the housing 1 enclose to form the water groove 22. It will be appreciated that the heat exchanger 4 is substantially a plate-shaped structure, and the heat exchanger 4 is provided opposite to one sidewall surface of the housing 1, thus to form two sidewall surfaces of the water groove 22, thereby the first sidewall 23, the heat exchanger 4 and the housing 1 enclose to naturally form three sidewall surfaces of the water groove 22. there is a notch formed on the water groove 22. The water flowing into the water groove 22 may flow from the notch to the power-on components. The water blocking plate 24 and the sidewall of the motor bracket 2 can be integrally formed, or be sealed on the motor bracket 2 by welding, bonding, or the like. Since the water blocking plate 24 is provided, the water blocking plate 24, the top wall 21, the first sidewall 23, the heat exchanger 4, and the housing 1 enclose to form a complete and no notch water groove 22. Thus it can prevent the water from flowing across the first overflow hole 211 and to the outer of the motor support 2 from the gap to affect the power-on components when the water flowing from the gap 111 of the top cover 11 is too large. At the same time, with the water blocking plate 24, the water can flow back to the first overflow hole 211, so that water flowing from the gap 111 can flow into the water pan 3 as much as possible.

In conjunction with the above-described embodiments having the first sidewall 23, please refer to FIGS. 3 to 7 again, the motor bracket 2 also has a second sidewall 25 connected to the top wall 21, and the second sidewall 25 is located on an end of the top wall 21 away from the first sidewall 23, and the second sidewall 25 is provided with the water blocking plate 24, and the water blocking plate 24 and the second sidewall 25 enclose to form an overflow groove.

In the present embodiment, the second sidewall 25 and the top wall 21 are connected to form an included angle, and the included angle can be a right angle, an acute angle or an obtuse angle. The first sidewall 23, the top wall 21 and the second sidewall 25 form a step structure. If the water blocking plate 24 only block water, when the water flow is too large and blocked by the water blocking plate 24 to reflow, it will flow over the first overflow hole 211 and gather on the top wall 21. Since the water blocking plate 24 and the second sidewall 25 enclose to form an overflow groove 26, the overflow groove 26 can receive the water flowing across the first overflow hole 211 to avoid the water being accumulated on the top wall 21 when the water is too larger.

Further, as shown in FIGS. 6 and 7, the second sidewall 25 is provided with a second overflow hole 251 corresponding to the overflow groove 26, and a bottom of the second sidewall 25 faces the water pan 3.

In the present embodiment, the shape of the second overflow hole 251 can be circular, elliptical, rectangular, or the like, which is not specifically defined herein. It will be appreciated that the size of the second overflow hole 251 should be less than or equal to the size of the second sidewall 25 located within the overflow groove 26. Since the second overflow hole 251 is provided at a position of the second sidewall 25 corresponding to the overflow groove 26, the water inside the overflow groove 26 can flow to the inner wall of the second sidewall 25 through the second overflow hole 251, since the bottom of the sidewalls faces the water pan 3, the water flowing through the second overflow hole 251 can flow into the water pan 3 along the inner wall surface of the second sidewall 25. Thus, the second sidewall 25 diverts water, which can avoid water droplets splashing when the water directly falls on the water pan 3, thereby avoiding to affect the motor and generate noise. The bottom of the second sidewall 25 can be provided in the water pan 3, or can be provided at a position of a certain distance above the water pan 3. Alternatively, the second overflow hole 251 is provided below the overflow groove 26. Thus, even when the water level in the overflow groove 26 is not high, water can also be introduced into the water pan 3 from the second overflow hole to avoid water being accumulated in the overflow groove 26.

In combination with the above embodiment, and further referring to FIGS. 3 to 7, the water blocking plate 24 includes a side plate 241 and a bottom plate 242 connecting with the side plate 241 and the second sidewall 25. The bottom plate 242 is tilted downward from the side plate 241 to the second sidewall 25. The side plate 241 and the bottom plate 242 can be integrally formed, or be connected by bonding, welding, or the like, such that the bottom plate 242 is titled downward from the side plate 241 to the sidewall, the bottom plate 242 can guide the water accumulated in the overflow groove 26, so that the water can flow smoothly into the second overflow hole 251.

In an embodiment, the dehumidifier further includes a water guiding member (not shown), one end of the water guiding member (not shown) is in communication with the first overflow hole 211, and the other end of the water guiding member is provided close to the second sidewall 25, and forms a gap with the second sidewall 25 to introduce water flowing through the first overflow hole 211 into the second sidewall 25.

In the present embodiment, the water guiding member (not shown) can be a plate, a tube, a support arm, or the like, only that the water guiding member is capable of guiding the water of the first overflow hole 211 to the inner wall surface of the sidewall. One end of the water guiding member (not shown) can be disposed a certain distance away from the lower end of the first overflow hole 211, or contact or connect with the lower end of the first overflow hole 211. There is a gap between the other end of the water guiding member (not shown) and the sidewall, and the water can be smoothly guided from the first overflow hole 211 to the inner wall surface of the second sidewall 25, which can avoid water droplets splashing when the water directly falls on the water pan 3, thereby avoiding affecting the motor and generating noise. In other embodiments, the first overflow hole 211 can also be provided at the intersection of the top wall 21 and the second sidewall 25. Thus, the water in the first overflow hole 211 can flow directly to the inner wall surface of the second sidewall 25 and be guided by the second sidewall 25.

In an embodiment, please refer to FIGS. 3 to 6 again, the handle 12 includes a gripping member 121 and a pulling member 122 connected to the gripping member 121, one of the pulling member 122 and the housing 1 is provided with a sliding member 123, the other one of the pulling member 122 and the housing 1 is provided with a sliding groove 13 extending in the vertical direction, and the sliding member 123 is slidably provided in the sliding groove 13.

In the present embodiment, the sliding member 123 can be a sliding rail, a sliding buckle or the like. Since the sliding member 123 is provided within the sliding groove 13, and can be moved up and down in the sliding groove 13, it is possible to limit the shaking of left and right of the handle 12 to ensure the verticality of the handle 12, so that the pull is more smooth. And an upper most position and a lower most position of the handle 12 are also defined, it is possible to prevent the over pulling or pushing of the handle 12. The pulling member 122 and the gripping member 121 can be integrally formed, or can be formed independently from each other. The gripping member 121 is typically made of a plastic material such that the user can grab more comfortable, and the pulling member 122 can be a pulling rod. The pulling rod can be provided with one or two, when only one pulling rod is provided, the pulling rod is provided in the middle position of the gripping member 121, when two pulling rod is provided, the two pulling rods are symmetrically distributed at the two ends of the grip portion 121. In this way, the received force is evenly distributed, and the pulling effect is better.

Specifically, the pulling member 122 includes a pulling rod provided at both ends of the gripping member 121, and a sliding groove 13 is provided at each pulling rod, and the housing 1 is provided with a sliding member 123 corresponding to the sliding groove 13. In this way, the pulling of the handle 12 is more stable and smooth. It will be appreciated that the distance between the two pulling rods needs to facilitate the human hands to hold.

Further, the sliding groove has a first limit sliding position and a second limit sliding position, and when the sliding member 123 slides to the first limit sliding position, the gripping member 121 protrudes from the top cover 11, and when the sliding member 123 slides to the second limit sliding position, the top surface of the gripping member 121 is flush with the top surface of the top cover, or the top surface of the gripping member 121 is lower than the top surface of the top cover.

In the present embodiment, when the sliding member 123 slides to the first limit sliding position, due to the restriction of the sliding groove 13, the handle 12 cannot be pulled up further, so that the dehumidifier can be smoothly lifted; when the sliding member 123 slides to the second limit sliding position, due to the restriction of the sliding groove 13, the handle 12 cannot fall further, and the handle 12 is fixed to this position. As such, when the dehumidifier needs to be moved and lifted, only the handle 12 needs to be pulled up, and then the handle 12 slides and is fixed to the first limit sliding position by the limiting and fixing function of the sliding groove, then the dehumidifier can be smoothly lifted. When there is no need to use the handle 12, the sliding member 123 can be slid to the second limit sliding position, so that the handle 12 is flush with the top cover 11 or less than the top cover 11, the coordination and consistency between the handle 12 and the overall appearance of the product can be maintained. With simple structure and easy operation, the dehumidifier not only has the function of handle 12, but also does not occupy space, and can ensure the overall consistency of product appearance.

Figure 1:
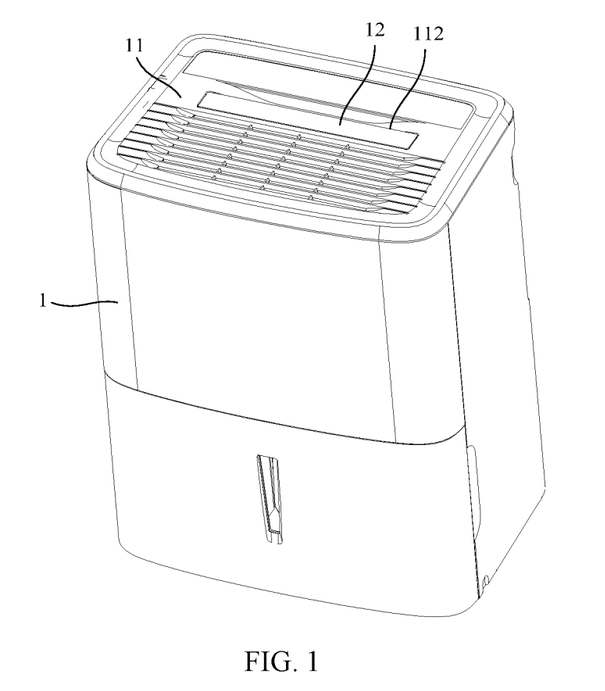
FIG. 1 is a schematic structural diagram of an embodiment of a dehumidifier of the present application.
Figure 2:
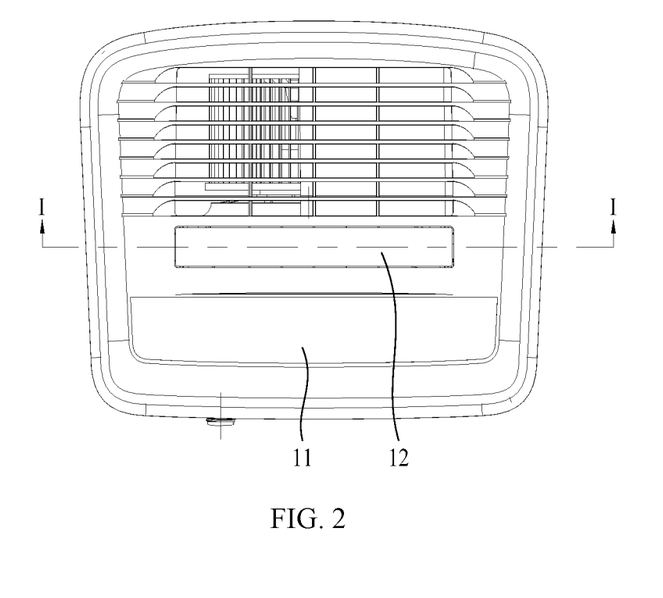
FIG. 2 is a schematic top view of the dehumidifier in FIG. 1.
Figure 3:
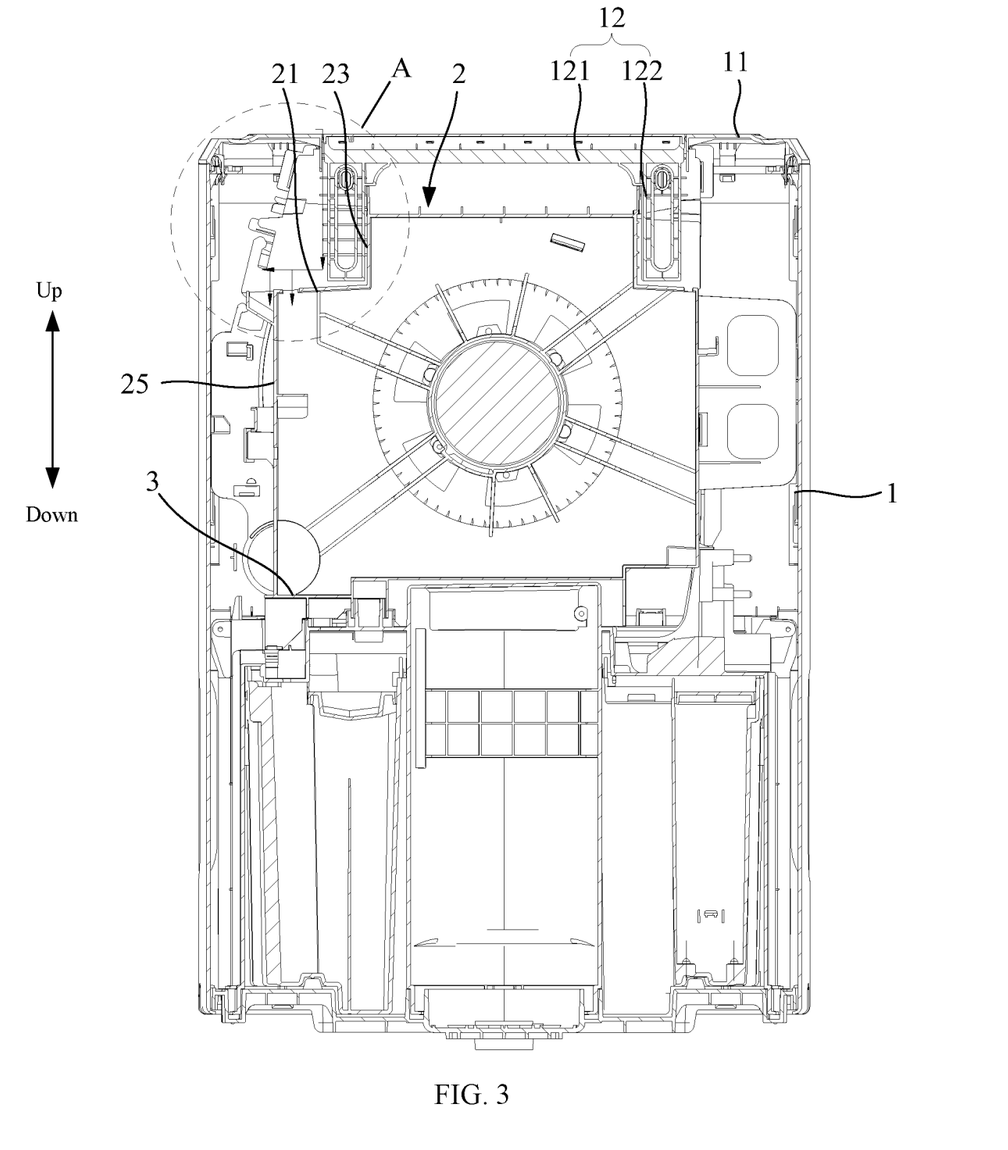
FIG. 3 is a schematic cross-sectional view along the line I-I in FIG. 2.
Figure 4:
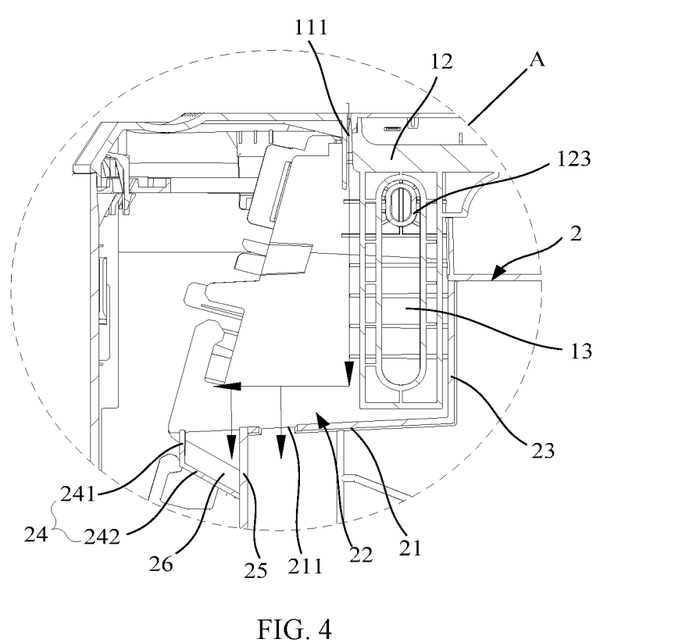
FIG. 4 is an enlarged view of portion A in FIG. 3.

On the basis of the above embodiment, further refer to FIGS. 4 to 6, the outer wall surface of the sliding member 123 is spaced apart from the inner wall surface of the sliding groove 13, so that the sliding member 123 can slid from the first limit sliding position to the second limit sliding position. As such, when it does not need to use the handle 12, the user only needs to release the hand, that is, the handle 12 can automatically fall to a position flush with or lower than the top cover 11 by gravity. Thus, the user does not need to apply force to press down the handle 12, which improves the user's use experience and the user's use effect.

The above is only the preferred embodiment of the present application and does not limit the scope of the patent of the present application. Under the inventive concept of the present application, any equivalent structural transformation made by using the contents of the description and drawings of the present application, or any direct/indirect application in other relevant technical fields, is included in the scope of patent protection of the present application.

The invention claimed is:

1. A dehumidifier comprising:
    a housing including:
        a top cover provided with a mounting hole; and
        a handle movably provided in the mounting hole in a vertical direction, a gap being formed between the handle and a circumferential wall surface of the mounting hole;
    a motor bracket provided in the housing, the motor bracket including a top wall below the gap and a sidewall connected to the top wall, and the top wall being provided with an overflow hole;
    a water pan provided below the overflow hole and configured to receive water flowing out via the overflow hole; and
    a heat exchanger;
    wherein the top wall, the sidewall, the heat exchanger, and the housing enclose to form a water groove below the gap, and the overflow hole is provided in the water groove.

2. The dehumidifier according to claim 1, wherein the overflow hole extends in a width direction of the top wall and penetrates through the top wall.

3. The dehumidifier according to claim 1, wherein:
    the motor bracket further includes a water blocking plate; and
    the water blocking plate, the top wall, the sidewall, the heat exchanger, and the housing enclose to form the water groove.

4. The dehumidifier according to claim 1, wherein:
    an annular plate is provided at the top wall; and
    the annular plate and the top wall form the water groove.

5. The dehumidifier according to claim 1, wherein:
    the sidewall is located on an end of the top wall, the sidewall being provided with a water blocking plate; and
    the water blocking plate and the sidewall enclose to form an overflow groove.

6. The dehumidifier according to claim 5, wherein:
    the overflow hole is a first overflow hole;
    the sidewall is provided with a second overflow hole corresponding to the overflow groove; and
    a bottom of the second sidewall faces the water pan.

7. The dehumidifier according to claim 6, wherein the second overflow hole is provided below the overflow groove.

8. The dehumidifier according to claim 5, wherein the water blocking plate includes a side plate and a bottom plate connected to the side plate and the sidewall, the bottom plate being titled downward from the side plate to the sidewall.

9. The dehumidifier according to claim 8, wherein the side plate and the bottom plate are integrally formed.

10. The dehumidifier according to claim 5, wherein the overflow hole is provided at an intersection of the top wall and the sidewall.

11. The dehumidifier according to claim 5, further comprising:
a water guiding member, one end of the water guiding member being in communication with the overflow hole, another end of the water guiding member being close to and spaced apart from the sidewall, and the water guiding member being configured to guide water flowing through the overflow hole to the sidewall.

12. The dehumidifier according to claim 1, wherein the top wall is titled downward from a position corresponding to the gap to the overflow hole.

13. The dehumidifier according to claim 1, wherein the handle is provided in a central portion of the top cover.

14. The dehumidifier according to claim 1, wherein:
the handle includes a gripping member and a pulling member, the pulling member being connected to the gripping member; and
one of the pulling member and the housing is provided with a sliding member, and another one of the pulling member and the housing is provided with a sliding groove extending in the vertical direction, the sliding member being slidably provided in the sliding groove.

15. The dehumidifier according to claim 14, wherein the pulling member includes a pulling rod provided at a central position of the gripping member.

16. The dehumidifier according to claim 14, wherein:
the sliding groove has a first limit sliding position and a second limit sliding position;
the gripping member protrudes from the top cover when the sliding member slides to the first limit sliding position; and
when the sliding member slides to the second limit sliding position, a top surface of the gripping member is flush with or lower than a top surface of the top cover.

17. The dehumidifier according to claim 16, wherein an outer wall surface of the sliding member forms a gap with an inner wall surface of the sliding groove.

18. The dehumidifier according to claim 14, wherein:
the pulling member includes pulling pods each provided at one end of the gripping member;
the sliding groove is one of sliding grooves each provided at one of the pulling pods; and
the sliding member is one of sliding members each provided at a position of the housing corresponding to one of the sliding grooves.

19. A dehumidifier comprising:
a housing including:
a top cover provided with a mounting hole; and
a handle movably provided in the mounting hole in a vertical direction, a gap being formed between the handle and a circumferential wall surface of the mounting hole;
a motor bracket provided in the housing, wherein:
the motor bracket includes a top wall below the gap and a sidewall connected to the top wall and located on an end of the top wall;
the top wall is provided with a water groove below the gap and an overflow hole, the overflow hole being provided in the water groove;
the sidewall is provided with a water blocking plate, the water blocking plate and the sidewall enclosing to form an overflow groove;
a water pan provided below the overflow hole and configured to receive water flowing out via the overflow hole; and
a water guiding member, one end of the water guiding member being in communication with the overflow hole, another end of the water guiding member being close to and spaced apart from the sidewall, and the water guiding member being configured to guide water flowing through the overflow hole to the sidewall.

20. A dehumidifier comprising:
a housing including:
a top cover provided with a mounting hole; and
a handle movably provided in the mounting hole in a vertical direction, wherein:
a gap is formed between the handle and a circumferential wall surface of the mounting hole;
the handle includes a gripping member and a pulling member, the pulling member being connected to the gripping member; and
one of the pulling member and the housing is provided with a sliding member, and another one of the pulling member and the housing is provided with a sliding groove extending in the vertical direction, the sliding member being slidably provided in the sliding groove;
a motor bracket provided in the housing, the motor bracket including a top wall below the gap, and the top wall being provided with an overflow hole; and
a water pan provided below the overflow hole and configured to receive water flowing out via the overflow hole.

* * * * *